Aug. 8, 1961     T. F. SCHLICKSUPP     2,995,244
SEPARATING APPARATUS

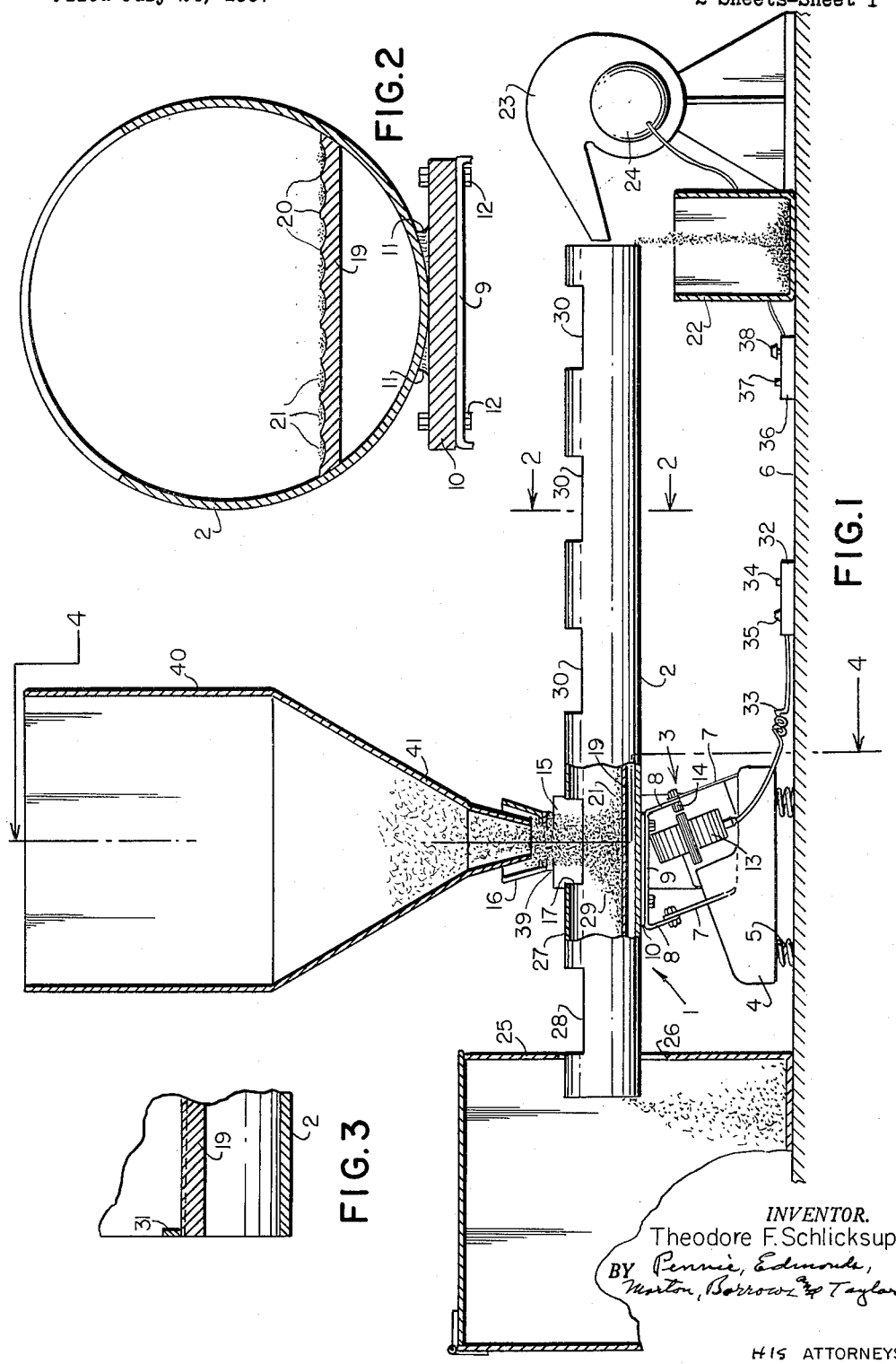

Filed July 24, 1957     2 Sheets-Sheet 2

INVENTOR.
Theodore F. Schlicksupp

BY

HIS ATTORNEYS ated Aug. 8, 1961

2,995,244
SEPARATING APPARATUS
Theodore F. Schlicksupp, Essex Fells, N.J. (% Foremost Machine Builders, Inc., 83 Dorsa Ave., Livingston, N.J.); H. Michael Albers, administrator of the estate of said Theodore F. Schlicksupp, deceased
Filed July 24, 1957, Ser. No. 673,890
1 Claim. (Cl. 209—134)

This invention relates to apparatus for separating classes of dry materials and more particularly for separating a granular and powder mixture of materials of different densities.

Although this apparatus has general utility for the separation of such materials, in the manufacture of various kinds of electrical apparatus a considerable amount of insulated wire scrap is produced, and the apparatus is particularly useful in the recovery of valuable material from such scrap. Some scrap wire may be insulated with a plastic such as Vinylite or the like, while other wire may be insulated with rubber and fabric or with fabric alone. Where the wire is insulated with a plastic material, it may be desirable to recover both the metal and the plastic, whereas with other insulations, only the metal of the wire whether copper, aluminum or other metal will have value.

In re-claiming these materials, the scrap wire is first put through a grinder which reduces it to a granular and powder mixture of the materials. This may be done in any suitable apparatus, one appropriate apparatus being disclosed in my co-pending application Serial No. 674,230, filed July 25, 1957.

The primary object of the present invention is to provide a separating apparatus or unit by means of which the denser materials such as the granular and smaller particles of metal and the lighter materials, some granular and some in powder form and consisting of the insulation material, may be separated from one another.

Another object of the invention is to provide a separating apparatus of this sort which occupies little space and which is easily operated and controlled.

Another object of the invention is to provide in such an apparatus for as nearly as possible complete separation of the metallic and non-metallic materials, that is, of the denser and lighter materials.

A further object of the invention is to provide an apparatus of this kind which will have a high production rate.

In accordance with my invention a vibrating conveyor is provided with an elongated conveyor member which may be in the form of either an elongated trough structure or an elongated tubular structure, it being important, however, that such structure be as rigid as possible. In the case of the trough structure it is enclosed or partially enclosed for about one-quarter of its length, the remainder being unenclosed. The vibrating conveyor member is provided with an electromagnetic or other suitable vibrating mechanism which will impart a type of vibration thereto which produces a propulsion or feeding effect upon the material, particularly the denser or metallic granules or particles.

The material to be separated is fed into the conveyor member in the form of a thin continuously flowing curtain which falls by gravity into the vibrating conveyor at a feeding-in point which is located at a distance from one end of the conveyor in the neighborhood of one-third the length of the conveyor. The vibrating mechanism is arranged continuously to propel the denser or metallic granular and finer particles along the longer portion of the conveyor member to a point of discharge which is usually at the end. A current of air is caused to flow along the conveyor in the opposite direction by means of a blower, or otherwise, and this air current blows the lighter material from the descending curtain at the feed point along the short portion of the tube. It also frees any particles of the lighter material which may adhere to the denser material as it travels along the conveyor member.

Depending upon the density of the lighter particles some of them are carried along in the air current for several inches before they settle to the bottom or floor of the conveyor, whereas the heavier particles settle more promptly. All of these lighter particles, however, are moved forward by the air current against the propelling tendency of the vibrating conveyor and are continuously discharged at a discharge point for the lighter materials which is usually at the end of the shorter leg.

The invention will be more clearly understood from a consideration of the accompanying drawings and the detailed description which follows. In these drawings:

FIG. 1 is a view of the separating apparatus partly in side elevation and partly in longitudinal section;

FIG. 2 is a view in vertical section taken on line 2—2 of FIG. 1 and drawn to an enlarged scale;

FIG. 3 is a fragmentary vertical central section of the left end portion of the device of FIG. 1 showing a modification and drawn to about the same scale as FIG. 2;

Figures 4, 5:
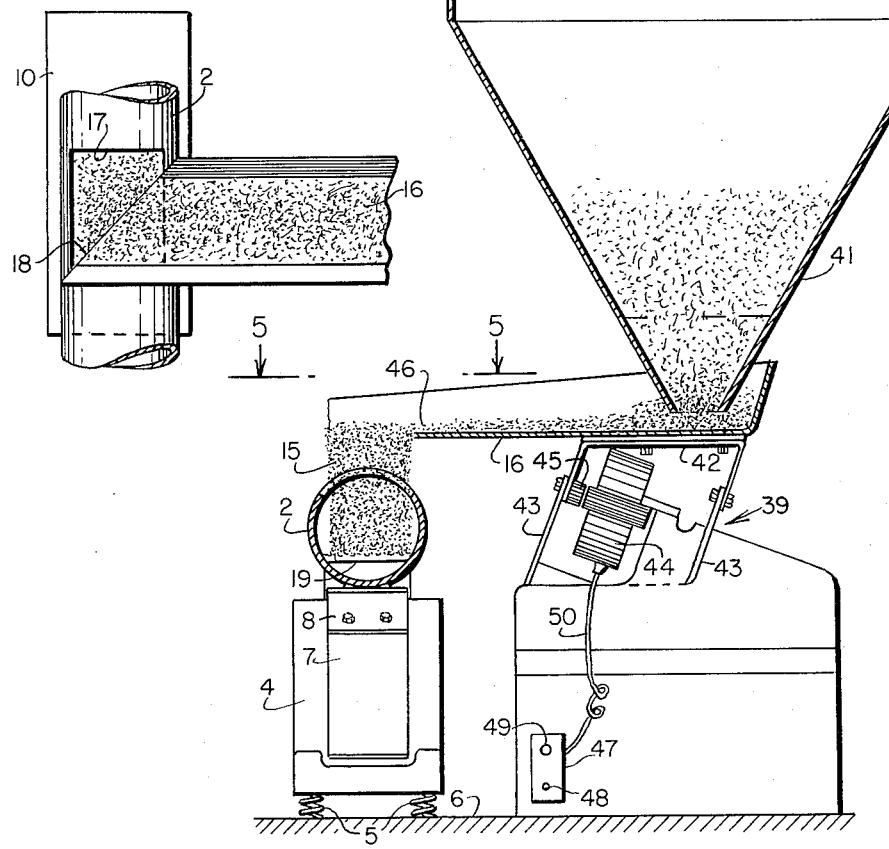
FIG. 4 is a view of the apparatus in vertical section taken on broken line 4—4 of FIG. 1.
FIG. 5 is a fragmentary plan view of a portion of the apparatus as indicated by the arrows 5—5 in FIG. 4.

The apparatus will be described in connection with the handling of a granular and powder mixture resulting from the grinding up of scrap copper wire insulated with a plastic material such as Vinylite. Consequently, the denser material will consist of a granular and powder mixture of copper, that is, the copper portion will be of various grain sizes and also of much smaller particles, while the lighter material will consist of a granular and powder mixture of the ground up plastic, that is, particles from a fairly large grain size to particles of a powder size.

Referring now to the drawings a vibrating conveyor is indicated generally by reference numeral 1. This comprises an elongated structure which may be partly a trough and partly a tube but which, in the embodiment illustrated, is an elongated tube 2. This member is about 3 to 3½" in diameter and some 30 to 36" in length. It is formed from a comparatively heavy gauge steel tube because it is important that this member be as rigid as possible from end to end in order to maintain throughout its length a dynamic propelling or conveying action which is powered by the vibration-imparting mechanism.

This vibration-imparting mechanism is indicated generally by numeral 3 and comprises a base portion 4 usually of cast iron and possessing considerable weight and mass. It is preferably supported on four coil compression springs 5, one at each corner of the rectangular base, these springs resting upon a suitable supporting surface 6 which may, for example, be a bench. Two parallel plate spring members 7 are rigidly secured at their lower ends to base 4, and at their upper ends are also rigidly secured by means of bolts or machine screws, as indicated, to the downwardly extending parallel legs 8 of a substantially rigid body member 9. The tubular conveyor member 2 is mounted upon body member 9 by means of a thick rigid plate 10 which is welded as indicated at 11 in FIG. 2 to the lower side of member 2 from about ¼ to about ⅓ of the tube length from its left end. Plate 10 is secured to body member 9 by means of bolts or screws 12.

An electromagnetic operating coil 13 is mounted on base 4 and has a cooperating armature 14 which is secured to the upper end of one of the parallel springs 7. The parallelogram arrangement of springs 7, body member 9 and base 4 is such that when the armature 14 is vibrated by means of an alternating, or pulsating, current sent through coil 13 the body member 9 and tubular member 2 will be vibrated in a well-known manner and in such a way as to produce a propelling effect toward the right end of the tube on the granulated and powdered material placed within the tube. However, because of the air current, only the denser materials, that is, the metallic particles move toward the right end of the tube, as will be apparent presently.

The mixture of granular and powder materials is continuously fed into tubular member 2 in the form of a thin curtain 15 which is discharged from the left end of a chute 16 (FIG. 5) and falls by gravity into member 2 through an opening 17 therein. This feed-in point is arranged at a distance from the left end of the conveyor member equal to approximately one-third of its length, although this location may be varied either to the left or right of that shown depending upon the completeness of separation required for the particular materials being handled. In order to arrange chute 16 at right angles to the conveyor member 2 its discharge edge is at a 45° angle so as to cause the curtain 15 to extend cross-wise of member 2.

The curtain 15 of the mixture of materials to be separated may be allowed to fall on the bottom surface of the tube 2, but I have found that the capacity of the apparatus is greatly increased by providing within the tube a horizontal floor 19 which extends from end to end of tube 2 and whose upper surface is fluted, as shown at 20 in FIG. 2, so as to provide a multiplicity of parallel lengthwise channels. The curtain 15, therefore, descends toward this floor and the denser portion, that is, the copper grains and smaller particles 21 will reach floor 19 and will immediately commence to move to the right along the flute floor towards a point of discharge which is usually the end of tube 2 where a receptacle 22 is provided.

A current of air is made to flow through tube 2 in a direction counter to the movement of the copper particles 21 by any appropriate means such, for example, as the blower 23. The outlet of the blower is positioned at the right end of tube 2 and arranged to direct the air current downwardly into angular contact with the stream of copper particles 21. It will be understood that this stream of copper particles is subdivided into substantially separate lanes or rows by the flutes 20. Blower 23 may be operated by any convenient source of power as the electric motor indicated at 24.

The air current striking curtain 15 of the falling mixture, blows the bulk of lighter particles, that is, the plastic particles to the left. The smaller, that is, the powder portion of such particles is carried along in the air stream to a point of discharge which is shown at the left end of tube 2 where they are received within an enclosed container or chamber 25. This chamber is enclosed in order to prevent the escape of the smallest particles which tend to form dust. An outlet for the air is provided, however, by making the entrance opening 26 somewhat larger in diameter than tube 2.

In order to confine and direct these lighter particles at least a portion 27 of the tube 2, such as indicated immediately at the left of the feed opening 17 is formed as a closed tube. An inspection opening 28 may, however, be provided to the left of this enclosed section 27. In other words, the velocity of the air current, although no high, is sufficient to carry the lighter particles forward into chamber 25 once the eddying produced by the contact of the air current with the curtain 15 has been subdued by the enclosed portion 27.

The heavier particles of the plastic or lighter material separated from curtain 15 by the air current will be carried somewhat to the left of the curtain, as indicated at 29, but will soon descend onto the floor 19. The vibration will tend to move these particles towards the right in the same way that the copper particles are moved, but the force of the air current is sufficient to overcome the propelling effect of such vibration and these larger particles will also be moved along the floor towards the left end of the tube and discharged into chamber 25.

Although the grinding apparatus used for grinding up the plastic insulated copper wire scrap is constructed to separate the plastic from the copper to as great an extent as possible, there will be an occasional granule of copper to which a piece of plastic is attached. Such granules will be propelled along floor 19 toward the right end of tube 2 but the current of air being directed downwardly against the floor will tend to loosen any such pieces of plastic from the copper and carry them to the left into chamber 25.

Such particles of plastic adhering to the copper are subjected to an increasing air velocity as they are carried toward the right end of tube 2, and are separated before reaching the discharge point for the copper. Also the separation of the copper stream into individual lines or channels by the flutes, aids in exposing the plastic particles to the action of the air current. The portion of tube 2 to the right of the feed-in opening 17 may, if desired, be provided with a number of spaced openings 30 in order that the completeness of separation between the plastic and copper may be observed.

For effective operation of the apparatus it is not necessary that the right portion of tube 2, that is, the portion to the right of opening 17 be closed. In other words, it may be an open tray and this portion may, therefore, be considered as a tray portion. It is, however, important that the tube be made as rigid as possible in order to carry the propelling vibrations produced by the device 2 to the extreme right end of floor 19 and such rigidity is improved by employing the tubular structure as shown in the drawings with or without the inspection openings 30 and 38.

In the modification shown in FIG. 3 the floor 19 has been provided with an upwardly extending lip 31 at its extreme left end. The purpose of this lip is to arrest any particles of plastic to which particles of copper may adhere and prevent them from being discharged into chamber 25. Lip 31 retains such particles on the surface of the floor and usually after they have been subjected to the action of the air currents for a sustained period of time the particles will separate, the copper being moved to the right and joining the copper streams 21.

The spacing of grooves 20 and the number of channels for the copper streams depend upon the grain size of the heavier material, that is, the copper or other metal. When the plastic scrap consists of pieces of heavy gauge wire, the grinding apparatus is set to reduce such wire to particles of comparatively large grain size. However, when the gauge of the scrap is smaller the grain size is also smaller, and the number of channels in floor 19 is increased for the handling of these smaller grain sizes. This can be done by replacing the floor 19 as shown, with a floor having a finer fluting, or by providing a number of separate units for the purpose of handling the wire scrap of different wire sizes.

The capacity of the separating unit has been found to be substantially increased by providing enough flutes 20 so as to increase the number of channels sufficiently to make the streams of copper granules quite shallow, advantageously about the depth of the largest granules in the streams. As an example it has been found that by using a floor 19 having eighteen lanes instead of the nine illustrated in FIG. 2 the output was doubled for fine copper particles such as those coming from ground-up number eighteen wire.

In the operation of this apparatus it is important to be able to regulate the amplitude of the propelling vibrations produced by the vibration mechanism 3, the velocity of the air current produced by the blower 23 and the rate of feed of the continuously fed curtain 15 of the mixture to be separated. These factors are to be properly coordinated in order to produce the desired one-hundred percent separation between the copper and the plastic materials and maximum rate of output of the apparatus.

In order to control and regulate the electro-mechanical vibrating apparatus 3, a control box 32 is provided which is supplied with electric current from a suitable source (not shown) and connected to operating coil 13 by conductors 33. The control box 32 has a control or shut-off switch 34 and a rotatable knob 35 by which the amount of current flowing through coil 13 may be adjusted. A somewhat similar control box 36 having an on-and-off switch 37 and a speed regulating knob 38 may be provided for the blower motor 24.

In order to regulate the feed of the mixture of material entering the feeding-in opening 17 the chute 16 is made to form a part of a vibratory feeding device 39. The mixture of materials to be separated is contained within a bin 40 the bottom of which is made in the form of a hopper 41 which discharges by gravity into the right end portion of chute 16, the feeding of the granular and powder mixture into this bin being automatically controlled in a well-understood manner.

The construction of the vibratory feeding mechanism 39 is substantially the same as that of the mechanism 3 previously described, although it may be of a somewhat smaller size if desired. Tray or chute 16 is firmly secured to a supporting member 42 having downwardly extending parallel legs which are, in turn, secured to a pair of parallel plate springs 43. The whole constitutes a parallelogram supporting mechanism for tray 16 to which a vibratory motion is imparted by the electromagnetic coil and an armature 45.

Regulation of the stream 46 of the material mixture along the bottom of trough 16 and over the edge 18 to form curtain 15 may be obtained precisely and within wide limits by means of a control box 47 which is similar to control box 32. Control box 47 has an on-and-off switch 48 and a current regulating knob 49 and is connected to coil 44 through conductors 50.

It will be understood that although only a single embodiment of the invention has been illustrated, changes in the arrangement of the parts and in the construction of the individual parts may be made, and it will, therefore, be understood that the scope of the invention is set forth in the appended claim.

I claim:

An electromagnetic vibrating separating apparatus for separating grain-size particles of dense material from a granular and powder mixture of materials of different densities, comprising a straight, rigid tubular member having an opening in the top thereof about one-third of the distance from the end proximate thereto to the opposite end, means for flowing said mixture by gravity through said opening into said tubular member, two plate spring members for supporting said member in horizontal position rigidly secured at their upper ends to the lower side of said tubular member beneath said opening, a base member having the lower end of said spring members secured rigidly thereto, said members being disposed parallel to one another but at an angle to the vertical, electromagnetic means for imparting a rapid combined upward and lengthwise vibration of low amplitude to said tubular member, a substantially horizontal floor member to receive said material and extending from end to end within said tubular member, the surface of said floor being longitudinally fluted to divide said floor into a large number of parallel, shallow and narrow channels extending from end to end of said tubular member, the depth of said flutings being approximately equal to the average size of the largest grains of the denser portion of said material, and means for causing a current of air to travel lengthwise of said tubular structure entering said opposite end, the denser material being discharged at said opposite end and the lighter material being carried by said air current out of the proximate end.

References Cited in the file of this patent

UNITED STATES PATENTS

| | | |
|---|---|---|
| 197,897 | Rice | Dec. 4, 1877 |
| 648,458 | Galvan | May 1, 1900 |
| 1,581,241 | Stebbins | Apr. 20, 1926 |
| 2,022,585 | Chance | Nov. 26, 1935 |
| 2,129,874 | Ross | Sept. 13, 1938 |
| 2,203,959 | Hammack | June 11, 1940 |
| 2,251,678 | Holt | Aug. 5, 1941 |
| 2,598,500 | Burke | May 27, 1952 |

FOREIGN PATENTS

| | | |
|---|---|---|
| 420,167 | Italy | Apr. 18, 1947 |
| 636,100 | Great Britain | Apr. 19, 1950 |